(No Model.)

H. W. HAMMOND.
PORTABLE STOCK CHUTE.

No. 430,426. Patented June 17, 1890.

Witnesses
L. B. Brock
J. W. Meister

Inventor
Henry W. Hammond
by F. B. Brock
Attorney

UNITED STATES PATENT OFFICE.

HENRY W. HAMMOND, OF WATERLOO, IOWA.

PORTABLE STOCK-CHUTE.

SPECIFICATION forming part of Letters Patent No. 430,426, dated June 17, 1890.

Application filed March 5, 1890. Serial No. 342,786. (No model.)

*To all whom it may concern:*

Be it known that I, HENRY W. HAMMOND, a citizen of the United States, residing at Waterloo, in the county of Black Hawk and State of Iowa, have invented certain new and useful Improvements in Portable Stock-Chutes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to stock-gangways for loading or unloading wagons, cars, or other vehicles.

The improvement consists of a portable stock-chute, the construction of which will first be fully described, and the novel features then pointed out in the claim.

Figure 1:
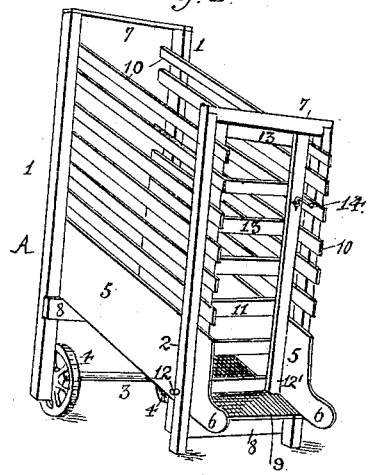
Figure 2:
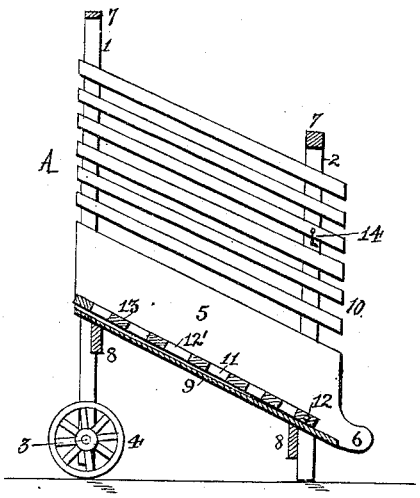

Figure 1 represents a perspective view of a device embodying my invention. Fig. 2 is a side elevation and section of my improvement, showing the end-gate lying upon the floor of the chute.

In the drawings, A represents my portable stock chute or gangway, which may be made of any suitable dimensions and material.

1 1 represent the front uprights or standards, and 2 2 the rear uprights. The latter preferably rest upon the ground.

3 is an axle hung in the lower ends of the uprights 1 1, and 4 4 are wheels mounted thereon to provide a suitable running-gear.

5 5 are base-boards lying along the floor on each side of the chute and are of sufficient width to prevent the feet of the stock from slipping through, as would be the case were the chute made entirely of slats.

6 6 are handles, formed by a prolongation of the base-boards 5, to enable the rear end of the chute to be lifted and wheeled about like a barrow.

7 7 are cross-pieces uniting the tops of the uprights, and 8 8 are similar pieces uniting the lower ends of the uprights.

9 is the floor of the chute, laid at an angle of about forty degrees; but any inclination desired may be given it.

10 are slats which form the sides of the chute, being nailed or otherwise fastened to the uprights, preferably parallel with the floor.

11 is the end-gate. It is hinged at its lower end upon a rod or rods 12 near the floor, and when open lies flat upon the floor 9. This gate is composed of uprights 12' and slats 13, the latter serving as cleats when the gate is flat to afford the stock a firm footing on the inclined floor.

14 are hooks or other fastenings for locking the end-gate when upright. The gate may, however, be hinged at the top or at the side, or it may be hinged on the front of the chute above the wheels.

The front of the stock-chute is preferably open. The stock-chute is light and strong and may be easily wheeled to any point desired.

When it is desired to load or unload stock, the chute is wheeled up against the tail-board of a wagon or side of a car, when the chute is ready for use.

What I claim as new is—

The herein-described portable stock-chute having an inclined floor, a wheeled support at one end, and an end-gate pivoted at its lower end and adapted to both close the chute and lie upon the chute-bottom to provide a footing.

In testimony whereof I affix my signature in presence of two witnesses.

HENRY W. HAMMOND.

Witnesses:
   H. J. HARRISON,
   T. M. WATTS.